United States Patent
Huang (10) Patent No.: US 10,643,806 B1
(45) Date of Patent: May 5, 2020

(54) TOUCHPAD MODULE AND COMPUTING DEVICE USING SAME

(71) Applicant: PRIMAX ELECTRONICS LTD., Taipei (TW)

(72) Inventor: Tai-Sou Huang, Taipei (TW)

(73) Assignee: PRIMAX ELECTRONICS LTD., Taipei (TW)

(*) Notice: Subject to any disclaimer, the term of this patent is extended or adjusted under 35 U.S.C. 154(b) by 0 days.

(21) Appl. No.: 16/423,269

(22) Filed: May 28, 2019

(30) Foreign Application Priority Data

Mar. 15, 2019 (TW) .............................. 108108947 A (51) Int. Cl.
*H01H 21/24* (2006.01)
*G06F 1/16* (2006.01)

(52) U.S. Cl.
CPC ............. *H01H 21/24* (2013.01); *G06F 1/169* (2013.01); *G06F 1/1616* (2013.01); *H01H 2221/044* (2013.01); *H01H 2239/074* (2013.01)

(58) Field of Classification Search
CPC ............. H01H 21/24; H01H 2221/044; H01H 2239/074; G06F 1/169; G06F 1/1616
See application file for complete search history.

(56) References Cited

U.S. PATENT DOCUMENTS

| | | | |
|---|---|---|---|
| 9,122,325 B2* | 9/2015 | Peshkin | G06F 3/016 |
| 10,120,449 B2* | 11/2018 | Khoshkava | G06F 3/0414 |
| 10,275,032 B2* | 4/2019 | Olien | G06F 3/016 |
| 10,372,214 B1* | 8/2019 | Gleeson | G06F 3/0412 |
| 10,514,759 B2* | 12/2019 | Taylor | G06F 3/044 |
| 10,585,480 B1* | 3/2020 | Bushnell | G06F 3/016 |
| 2010/0105452 A1* | 4/2010 | Shin | H04B 1/3838 |
| | | | 455/575.8 |
| 2011/0018816 A1* | 1/2011 | Liu | G06F 1/169 |
| | | | 345/173 |
| 2012/0206248 A1* | 8/2012 | Biggs | G06F 3/016 |
| | | | 340/407.2 |
| 2013/0044049 A1* | 2/2013 | Biggs | G06F 3/016 |
| | | | 345/156 |
| 2013/0194650 A1* | 8/2013 | Roth | B60R 1/02 |
| | | | 359/267 |
| 2019/0118728 A1* | 4/2019 | Oba | B60R 1/0605 |

* cited by examiner

Primary Examiner — Ricardo Osorio
(74) Attorney, Agent, or Firm — WPAT, PC (57) ABSTRACT

A touchpad module includes a base plate, a touch member, a switch, a supporting element and an elastic element. The base plate includes a triggering part. The switch is disposed on the touch member and aligned with the triggering part. The elastic element includes a fixing structure and a swinging structure. The swinging structure includes two lateral swinging segments and a middle swinging segment. The lateral swinging segments are arranged between the supporting element and the touch member. The middle swinging segment is arranged between the base plate and the touch member. The fixing structure is connected with the middle swinging segment and arranged between the lateral swinging segments. When an external force is exerted on the touchpad module, the middle swinging segment is swung toward the base plate, and the lateral swinging segments are swung away from the supporting element.

11 Claims, 8 Drawing Sheets

TOUCHPAD MODULE AND COMPUTING DEVICE USING SAME

FIELD OF THE INVENTION

The present invention relates to an input device, and more particularly to an input device with a touch control function.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. For efficiently operating an electronic device, a touchpad is used as an input device of the electronic device for controlling the operations of the electronic device.

Figure 1:
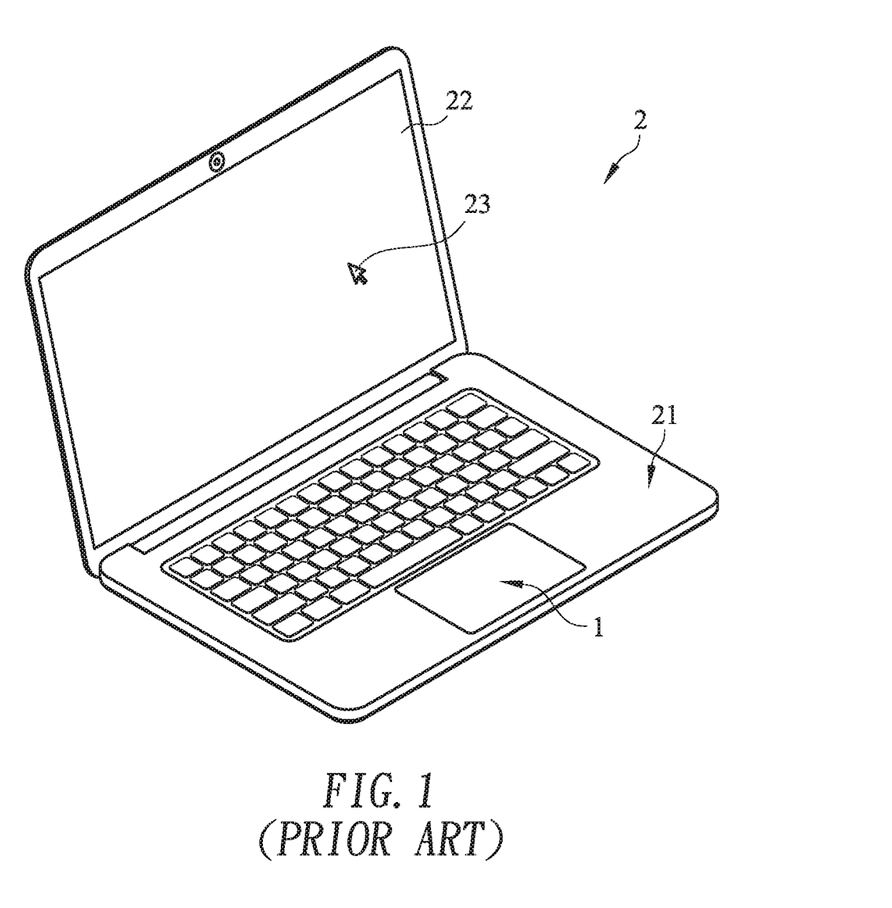
FIG. 1 schematically illustrates a conventional notebook computer with a touchpad module.

FIG. 1 schematically illustrates a conventional notebook computer with a touchpad module. As shown in FIG. 1, the touchpad module 1 is installed on a casing 21 of the notebook computer 2. Moreover, at least a portion of the touchpad module 1 is exposed outside so as to be touched by the user's finger. Consequently, the user may operate the touchpad module 1 to control the notebook computer 2. For example, in case that the user's finger is placed on the touchpad module 1 and slid on the touchpad module 1, a cursor 23 shown on a display screen 22 of the notebook computer 2 is correspondingly moved. Moreover, in case that the touchpad module 1 is pressed down by the user's finger, the notebook computer 2 executes a specified function. The use of the touchpad module 1 can implement some functions of the conventional mouse. In other words, the user may operate the notebook computer 2 through the touchpad module 1 without the need of additionally carrying or installing the mouse.

Figure 2:
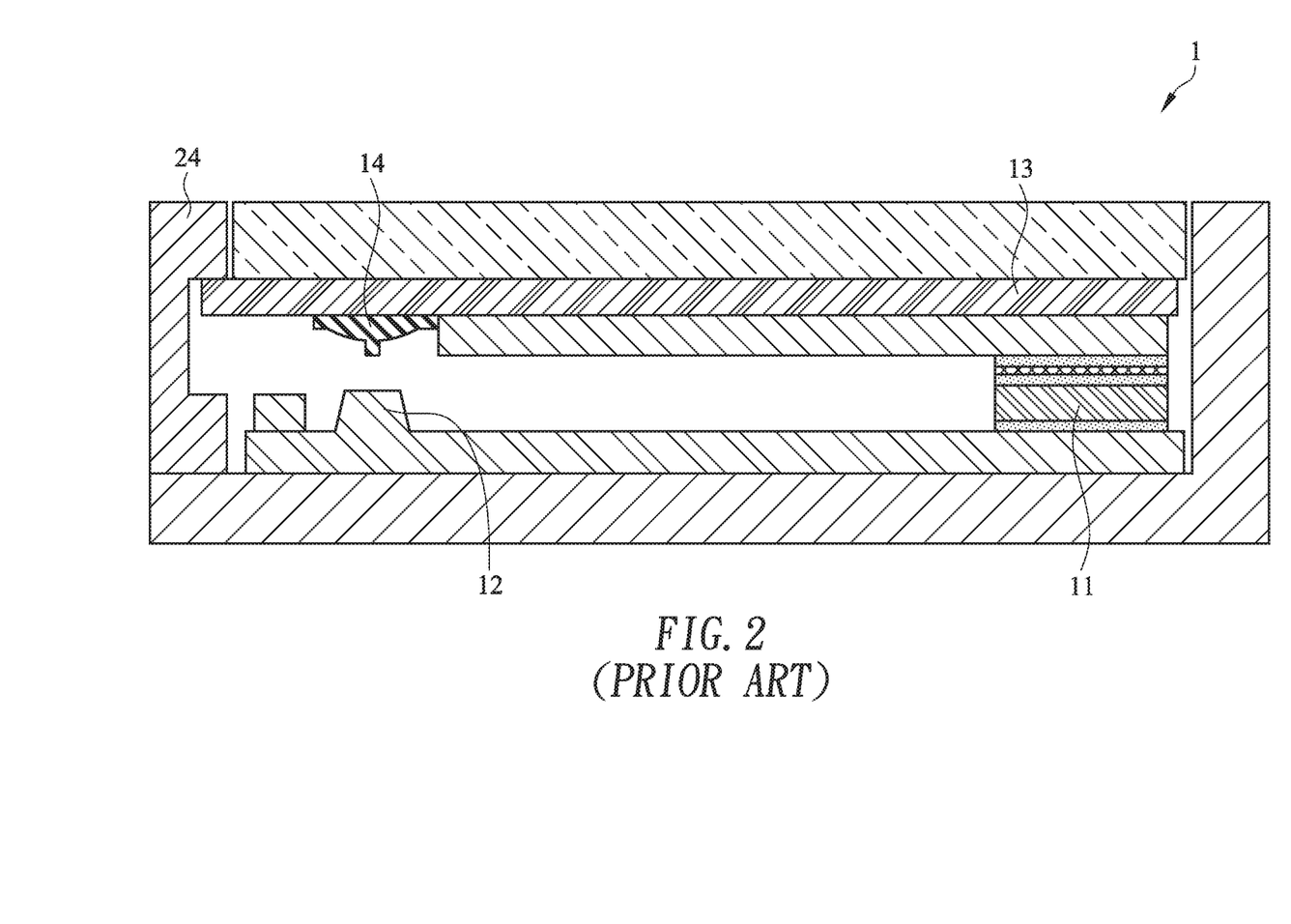
FIG. 2 is a schematic cross-sectional view illustrating the touchpad module as shown in FIG. 1, in which the touchpad module is not pressed down.
Figure 3:
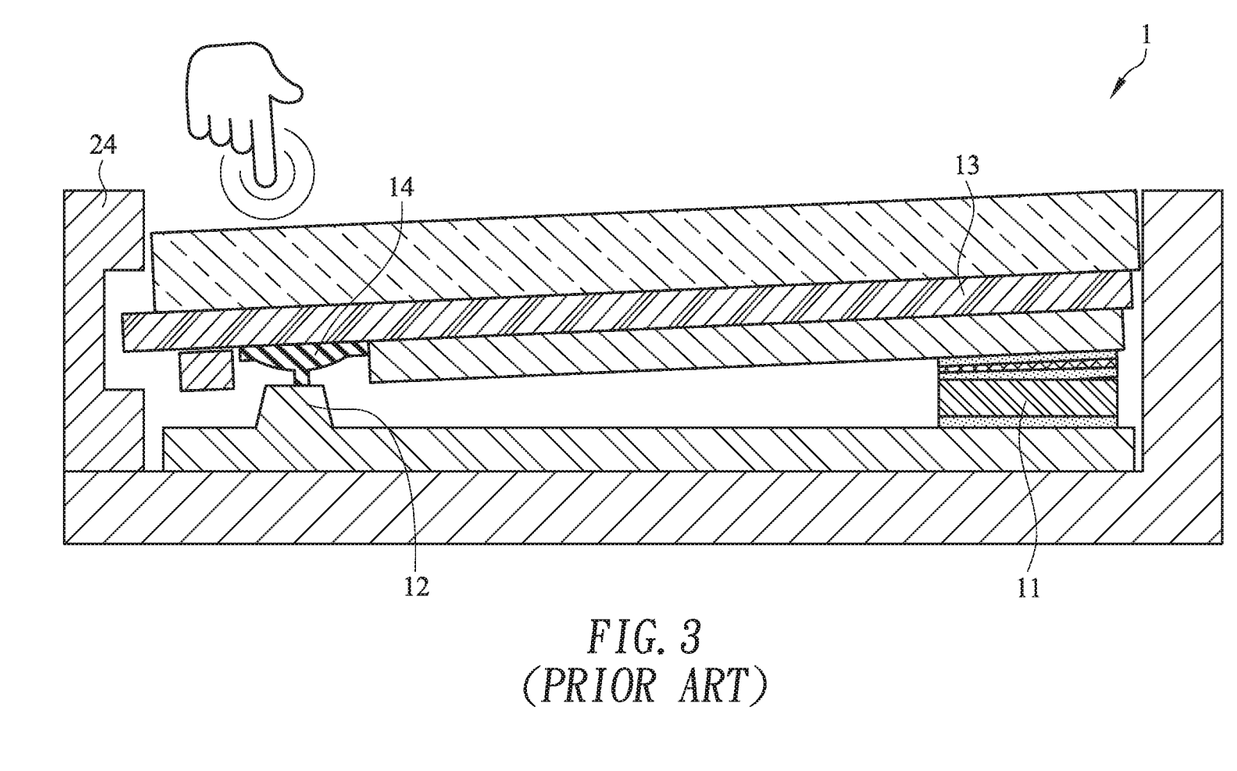
FIG. 3 is a schematic cross-sectional view illustrating the touchpad module as shown in FIG. 2, in which the touchpad module is pressed down.

FIG. 2 is a schematic cross-sectional view illustrating the touchpad module as shown in FIG. 1, in which the touchpad module is not pressed down. FIG. 3 is a schematic cross-sectional view illustrating the touchpad module as shown in FIG. 2, in which the touchpad module is pressed down. As shown in FIGS. 2 and 3, a fixing frame 24 is concavely formed in a casing 21 of the notebook computer 2. The touchpad module 1 is installed in the fixing frame 24. The touchpad module 1 comprises a supporting structure 11, a triggering part 12 and a touch member 13. The supporting structure 11 and triggering part 12 are located at two opposite sides of the fixing frame 24. The touch member 13 of the touchpad module 1 is connected with the supporting structure 11. Consequently, the touch member 13 of the touchpad module 1 may be swung relative to the triggering part 12 by using the supporting structure 11 as a fulcrum. The touchpad module 1 further comprises a switch 14. The switch 14 is located under the touch member 13 and aligned with the triggering part 12.

While the touch member 13 is pressed down by the user, the touch member 13 is swung downwardly relative to the triggering part 12 by using the supporting structure 11 as a fulcrum. When the switch 14 of the touchpad module 1 is pushed by the triggering part 12 of the fixing frame 24, the switch 14 is triggered to generate a switch signal to the notebook computer 2. According to the switch signal, the notebook computer 2 executes a corresponding function. When the touch member 13 is no longer pressed by the user, the touch member 13 is swung upwardly relative to the triggering part 12 in response to the elastic force of the supporting structure 11. Consequently, the touch member 13 is returned to its original position.

However, the conventional touchpad module 1 still has some drawbacks. For example, the supporting structure 11 is connected with the upper component and the lower component through iron elements or plastic structures (e.g., sponge structures). Consequently, as the iron elements or plastic structures are subjected to deformation, the touch member 13 can be swung upwardly or downwardly. Due to the design of the supporting structure 11, the upward/downward swinging action of the touch member 13 is usually aslant and unstable.

Therefore, there is a need of providing an improved touchpad module in order to overcome the above drawbacks.

SUMMARY OF THE INVENTION

An object of the present invention provides a touchpad module with a mechanism for increasing the swinging stability of a touch member.

Another object of the present invention provides a computing device with a touchpad module. The touchpad module includes a mechanism for increasing the swinging stability of a touch member.

The other objects and advantages of the present invention will be understood from the disclosed technical features.

In accordance with an aspect of the present invention, a touchpad module for a computing device is provided. The computing device includes a fixing frame. The touchpad module includes a base plate, a touch member, a switch, a supporting element and an elastic element. The base plate is disposed within the fixing frame, and includes a triggering part. The touch member is disposed within the fixing frame. The touch member and the base plate are opposed to each other. The switch is disposed on the touch member and aligned with the triggering part of the base plate. The supporting element is arranged between the base plate and the touch member. The elastic element includes a fixing structure and a swinging structure. The fixing structure is arranged between the supporting element and the touch member. The swinging structure includes two lateral swinging segments and a middle swinging segment. The middle swinging segment is connected between the two lateral swinging segments. The two lateral swinging segments are arranged between the supporting element and the touch member. The middle swinging segment is arranged between the base plate and the touch member. The fixing structure is connected with the middle swinging segment. The fixing structure is arranged between the two lateral swinging segments. When an external force is exerted on the touchpad module, the touch member is swung toward the base plate by using the supporting element as a fulcrum, so that the switch is contacted with the triggering part. While the touch member is swung toward the base plate, the middle swinging segment is swung toward the base plate, and the two lateral swinging segments are swung away from the supporting element.

When the external force exerted on the touchpad module is eliminated, the swinging structure is swung with respect to a junction between the middle swinging segment and the fixing structure in response to a restoring force of the elastic element. While the swinging structure is swung, the middle swinging segment is swung away from the base plate, the two lateral swinging segments are swung toward the supporting element, and the touch member is swung away from the base plate by using the supporting element as the fulcrum, so that the switch is separated from the triggering part.

In an embodiment, the touchpad module further includes a first adhesive layer, and the first adhesive layer is arranged between the swinging structure of the elastic element and the touch member. The middle swinging segment and the two lateral swinging segments of the swinging structure are covered by the first adhesive layer. The swinging structure is attached on the touch member through the first adhesive layer.

In an embodiment, the first adhesive layer has a U-shaped profile.

In an embodiment, the touch member includes a circuit board and a covering plate. The covering plate is located over the circuit board. The switch is disposed on the circuit board. The swinging structure is attached on the circuit board through the first adhesive layer.

In an embodiment, the fixing structure of the elastic element is fixed on the supporting element by a laser welding process.

In an embodiment, the touchpad module further includes a second adhesive layer, and the second adhesive layer is arranged between the base plate and the supporting element. The supporting element is attached on the base plate through the second adhesive layer.

In an embodiment, the two lateral swinging segments of the swinging structure are extended along a first direction, and the middle swinging segment is extended along a second direction and connected between the two lateral swinging segments. The first direction and the second direction are not in parallel with each other. The two lateral swinging segments and the middle swinging segment are collaboratively formed as the swinging structure with a U-shaped profile.

In an embodiment, each lateral swinging segment of the swinging structure and the fixing structure are separated from each other by a gap.

In an embodiment, the touchpad module further includes at least one fastening element, and the base plate is fixed on the fixing frame through the at least one fastening element.

In accordance with another aspect of the present invention, a computing device is provided. The computing device includes a casing, a processor and a touchpad module. The fixing frame is concavely formed in the casing. The processor is disposed within the casing. The touchpad module is disposed within the casing and electrically connected with the processor. The touchpad module includes a base plate, a touch member, a switch, a supporting element and an elastic element. The base plate is disposed within the fixing frame, and includes a triggering part. The touch member is disposed within the fixing frame. The touch member and the base plate are opposed to each other. The switch is disposed on the touch member and aligned with the triggering part of the base plate. The supporting element is arranged between the base plate and the touch member. The elastic element includes a fixing structure and a swinging structure. The fixing structure is arranged between the supporting element and the touch member. The swinging structure includes two lateral swinging segments and a middle swinging segment. The middle swinging segment is connected between the two lateral swinging segments. The two lateral swinging segments are arranged between the supporting element and the touch member. The middle swinging segment is arranged between the base plate and the touch member. The fixing structure is connected with the middle swinging segment. The fixing structure is arranged between the two lateral swinging segments. When an external force is exerted on the touchpad module, the touch member is swung toward the base plate by using the supporting element as a fulcrum, so that the switch is contacted with the triggering part. While the touch member is swung toward the base plate, the middle swinging segment is swung toward the base plate, and the two lateral swinging segments are swung away from the supporting element.

From the above descriptions, the present invention provides the touchpad module and the computing device with the touchpad module. The elastic element includes the U-shaped swinging structure and the fixing structure. The fixing structure is fixed on the supporting element. The fixing structure is connected with the middle swinging segment of the swinging structure and arranged between the two lateral swinging segments. The swinging structure of the elastic element includes the two lateral swinging segments and the middle swinging segment between the two lateral swinging segments. For complying with the U-shaped swinging structure, the first adhesive layer is a U-shaped adhesive layer. Due to this structure design, the contact area between the elastic element and the touch member is increased. Since the first adhesive layer is placed on the swinging structure to cover the swinging structure, the stability of switching the touch member relative to the base plate is enhanced. Due to this structural design, the swinging action of the touch member with respect to the base plate by using the supporting element as the fulcrum is stable (i.e., not aslant). Moreover, the results of the touch test indicate that the above structural design of the touchpad module can achieve stable travelling distance, click force and recovery ratio.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 4:
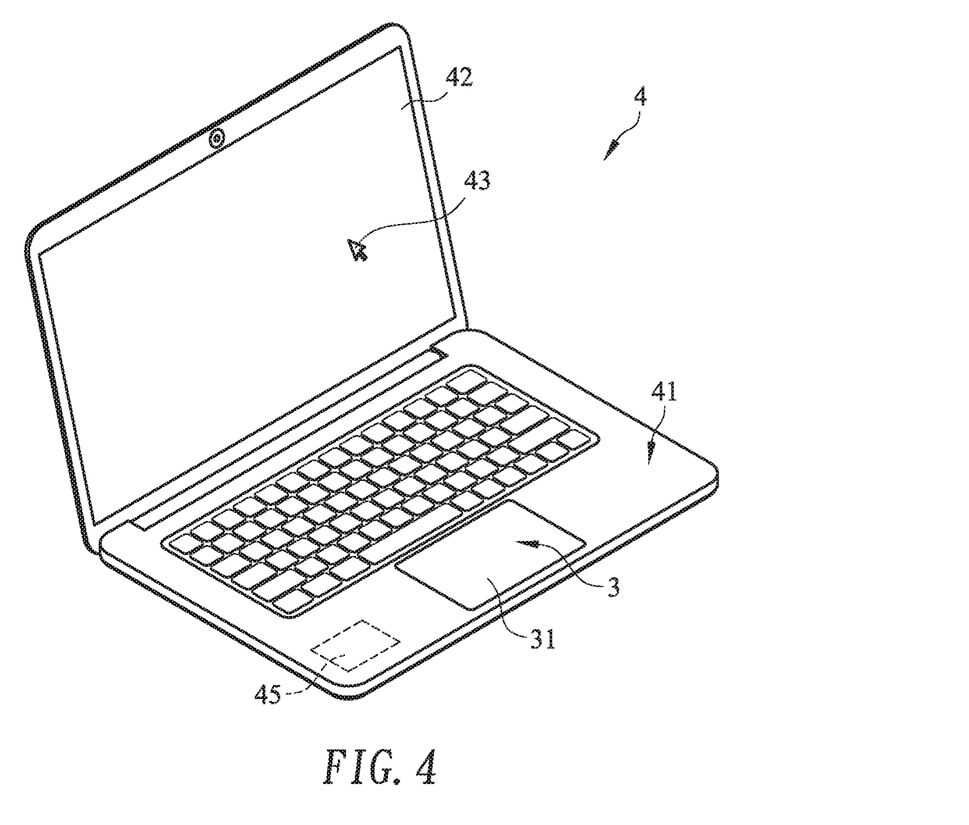
FIG. 4 is a schematic perspective view illustrating the outer appearance of a computing device with a touchpad module according to an embodiment of the present invention.

FIG. 4 is a schematic perspective view illustrating the outer appearance of a computing device with a touchpad module according to an embodiment of the present invention. An example of the computing device 4 includes but is not limited to a notebook computer. In an embodiment, the computing device 4 comprises a casing 41, a display screen 42, a processor 45 and a touchpad module 3. The processor 45 is disposed within the casing 41. Moreover, the processor 41 is used for processing electronic signals of the computing device 4. Moreover, a fixing frame 44 is concavely formed in the casing 41 (see FIG. 5). The touchpad module 3 is disposed within the fixing frame 44 and electrically connected with the processor 45. In addition, at least a portion of the touchpad module 3 is exposed outside so as to be touched by the user's finger. Consequently, the user may operate the touchpad module 3 to control the computing device 4. For example, in case that the user's finger is placed on the touchpad module 3 and slid on the touchpad module 3, a cursor 43 shown on the display screen 42 is correspondingly moved. Moreover, in case that the touchpad module 3 is pressed by the user's finger, the computing device 4 executes a specified function.

The other structure of the touchpad module 3 will be described in more details as follows.

Figure 5:
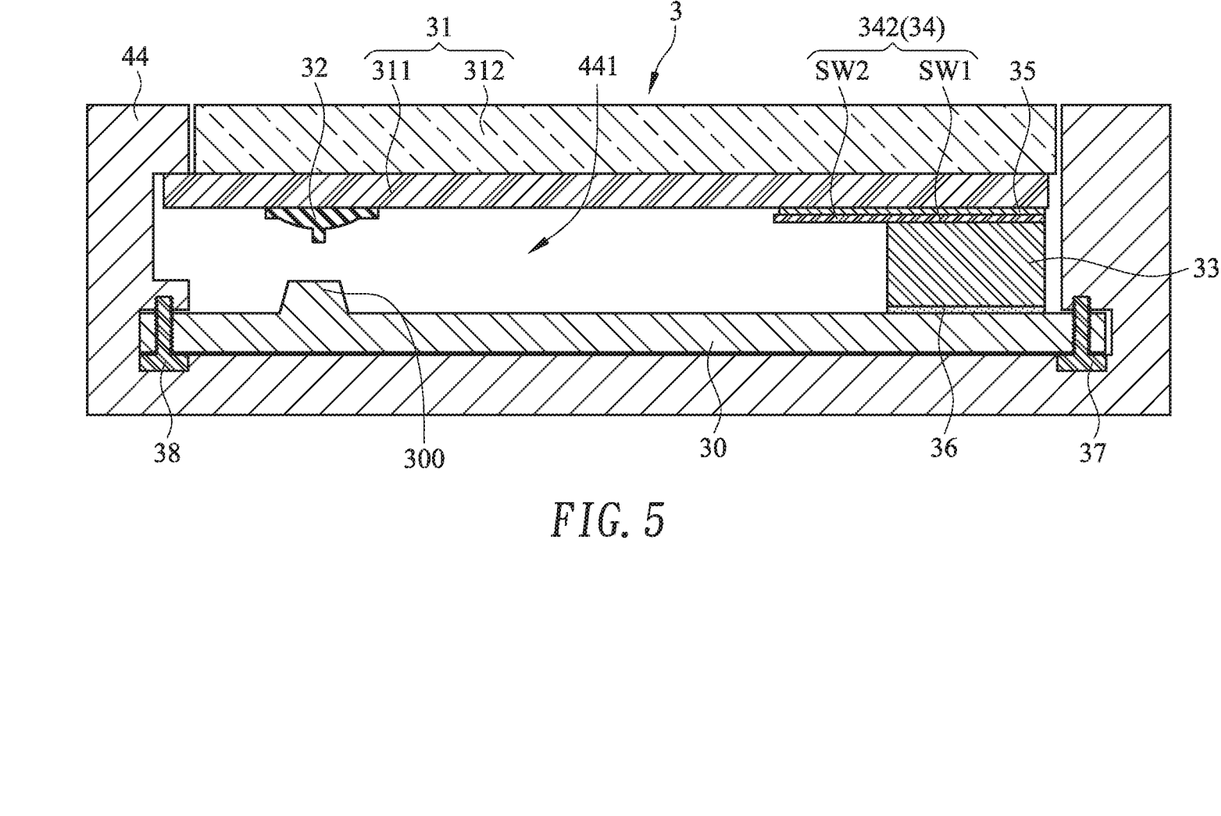
FIG. 5 is a schematic cross-sectional view illustrating portions of the fixing frame and the touchpad module of the computing device as shown in FIG. 4.
Figure 6:
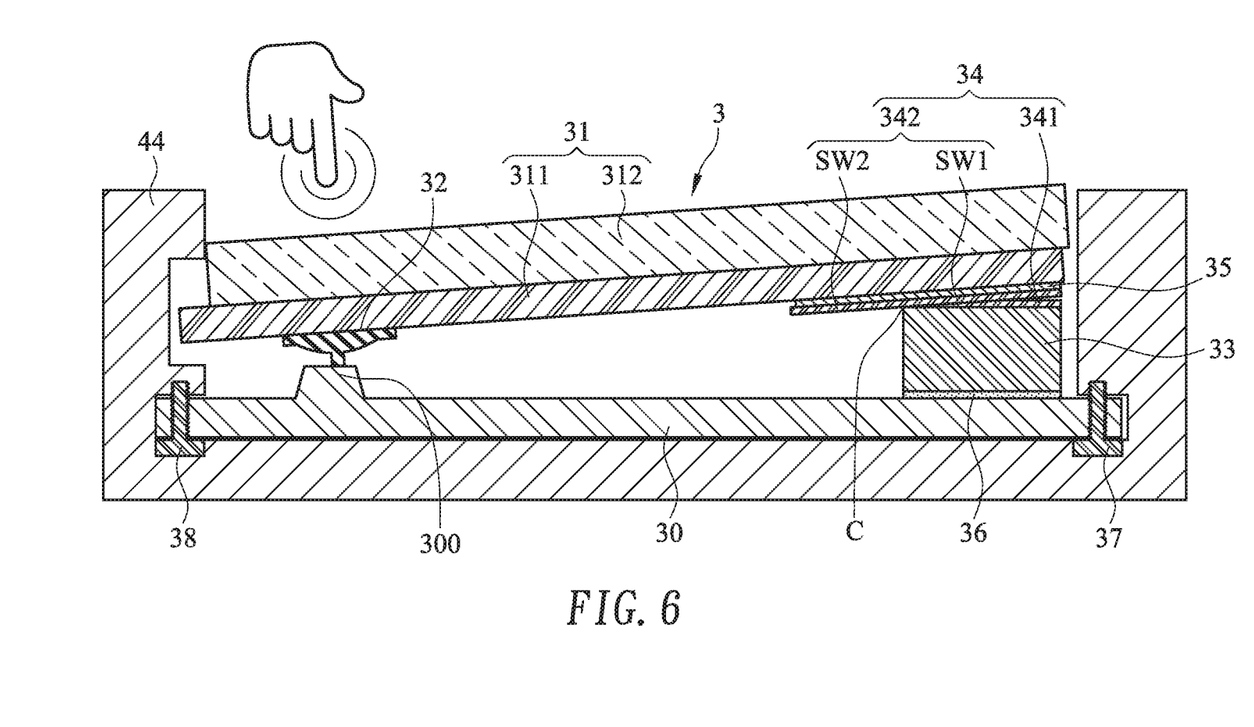
FIG. 6 is a schematic cross-sectional view illustrating the fixing frame and the touchpad module as shown in FIG. 5, in which an external force is exerted on the touchpad module.
Figure 7:
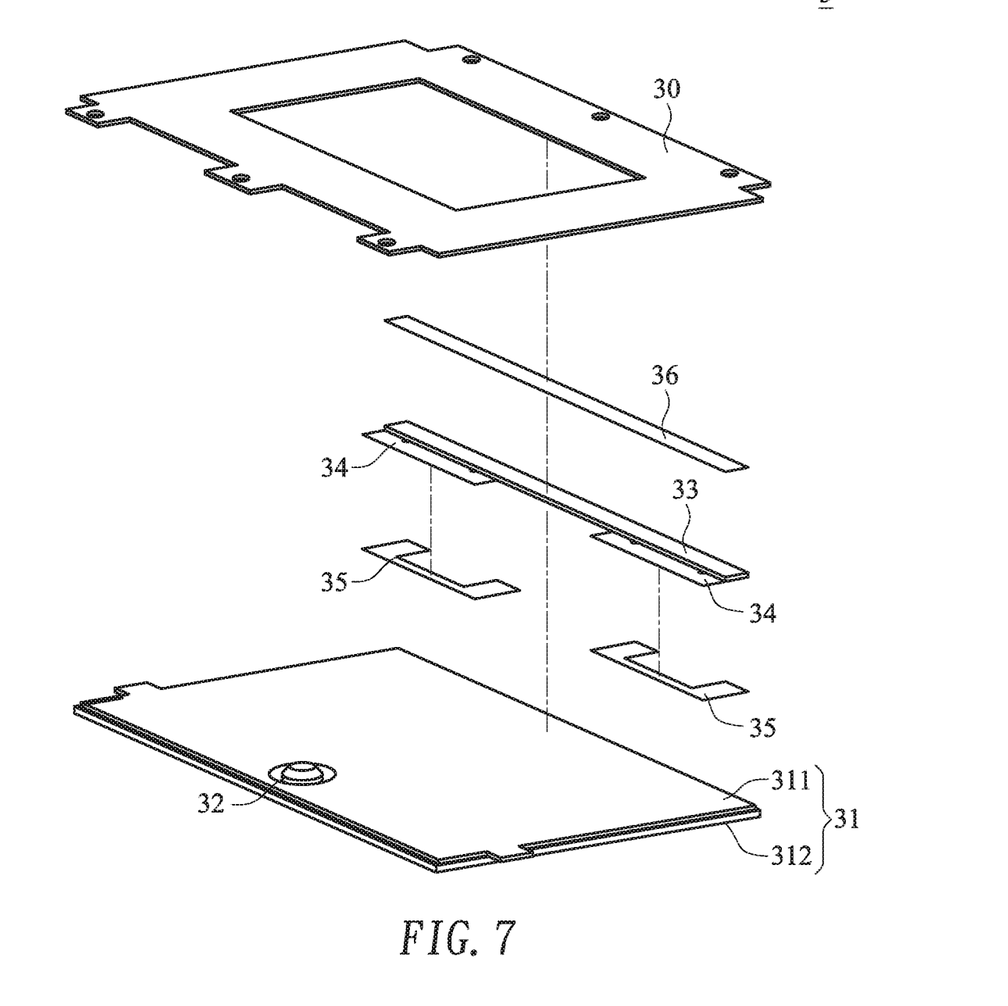
FIG. 7 is a schematic exploded view illustrating the touchpad module as shown in FIG. 5 and taken along a rear viewpoint.
Figure 8:
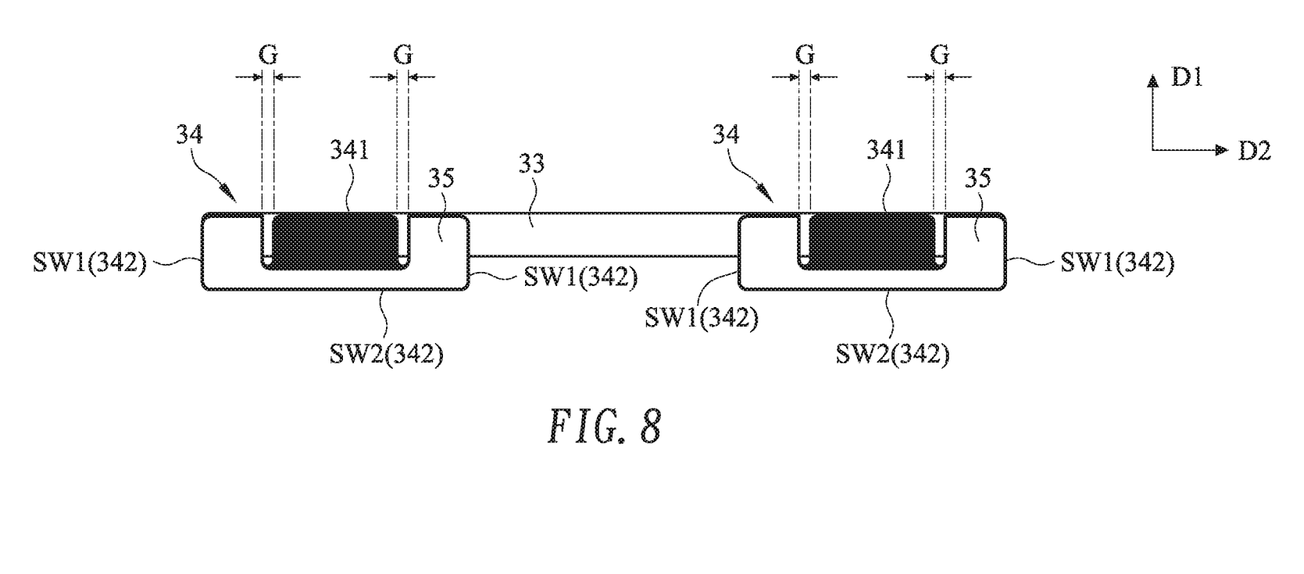
FIG. 8 is a schematic top view illustrating the combination of the supporting element, the elastic element and the first adhesive layer of the touchpad module as shown in FIG. 7.

Please refer to FIGS. 5, 6, 7 and 8. FIG. 5 is a schematic cross-sectional view illustrating portions of the fixing frame and the touchpad module of the computing device as shown in FIG. 4. FIG. 6 is a schematic cross-sectional view illustrating the fixing frame and the touchpad module as shown in FIG. 5, in which an external force is exerted on the touchpad module. FIG. 7 is a schematic exploded view illustrating the touchpad module as shown in FIG. 5 and taken along a rear viewpoint. FIG. 8 is a schematic top view illustrating the combination of the supporting element, the elastic element and the first adhesive layer of the touchpad module as shown in FIG. 7.

As shown in FIGS. 5 and 7, the fixing frame 44 of the computing device 4 comprises an accommodation space 441. The touchpad module 3 is accommodated within the accommodation space 441. In an embodiment, the touchpad module 3 comprises a base plate 30, a touch member 31, a switch 32, a supporting element 33 and at least one elastic element 34. The base plate 30 is disposed within the fixing frame 44. The base plate 30 comprises a triggering part 300. The touch member 31 is disposed within the fixing frame 44. Moreover, the touch member 31 and the base plate 30 are opposed to each other. The switch 32 is disposed on the touch member 31 and aligned with the triggering part 300 of the base plate 30. That is, the switch 32 is disposed on a surface of the touch member 31 that faces the base plate 30. The supporting element 33 is arranged between the base plate 30 and the touch member 31. Moreover, the supporting element 33 is located beside a first side of the fixing frame 44, and the triggering part 300 of the base plate 30 is located beside a second side of the fixing frame 44. Preferably but not exclusively, the supporting element 33 is made of metallic material. The elastic element 34 comprises a fixing structure 341 and a swinging structure 342. The fixing structure 341 is arranged between the supporting element 33 and the touch member 31. The swinging structure 342 comprises two lateral swinging segments SW1 and a middle swinging segment SW2. The middle swinging segment SW2 is connected between the two lateral swinging segments SW1. The two lateral swinging segments SW1 are arranged between the supporting element 33 and the touch member 31. The middle swinging segment SW2 is arranged between the base plate 30 and the touch member 31. The fixing structure 341 is connected with the middle swinging segment SW2 and arranged between the two lateral swinging segments SW1. In an embodiment, the fixing structure 341 is fixed on the supporting element 33 by a laser welding process. It is noted that the way of fixing the supporting element 33 is not restricted.

Please refer to FIGS. 5 and 6. When an external force is exerted on the touchpad module 3, the touch member 31 is swung relative to the base plate 30 by using the supporting element 33 as a fulcrum. As the touch member 31 is swung, the switch 32 on the touch member 31 is contacted with the triggering part 300 of the base plate 30 to issue an enabling signal to the computing device 4. According to the enabling signal, the computing device 4 executes a corresponding function. The detailed operations of the touchpad module 3 will be described later.

Please refer to FIGS. 5, 6 and 7. In an embodiment, the touchpad module 3 further comprises at least one first adhesive layer 35 and a second adhesive layer 36. The first adhesive layer 35 is arranged between the swinging structure 342 of the elastic element 34 and the touch member 31. Moreover, the middle swinging segment SW2 and the two lateral swinging segments SW1 of the swinging structure 342 are covered by the first adhesive layer 35. That is, the first adhesive layer 35 covers the swinging structure 342, but does not cover the fixing structure 341. The swinging structure 342 is attached on the touch member 31 through the first adhesive layer 35. The second adhesive layer 36 is arranged between the base plate 30 and the supporting element 33. The supporting element 33 is attached on the base plate 30 through the second adhesive layer 36. Preferably but not exclusively, the first adhesive layer 35 and the second adhesive layer 36 are pressure sensitive adhesives (PSA).

In this embodiment, the touchpad module 3 comprises two elastic elements 34 and two first adhesive layers 35. The two elastic elements 34 are arranged beside two opposite sides of the supporting element 33. The swinging structures 342 of the two elastic elements 34 are covered by the corresponding first adhesive layers 35. It is noted that the number of the elastic elements 34 and the number of the first adhesive layers 35 are not restricted.

In this embodiment, the two elastic elements 34 are disposed on the two opposite sides of the supporting element 33 by the laser welding process. Due to this arrangement, the length of the supporting element 33 may be adjusted according to the portion of the supporting element 33 between the two elastic elements 34. Since the length of the supporting element 33 is adjustable, the supporting element 33 can be applied to various touchpad modules with different sizes. Consequently, the fabricating cost of the touchpad module is reduced.

As shown in FIG. 8, the swinging structure 342 of the elastic element 34 comprises the two lateral swinging segments SW1 and the middle swinging segment SW2. The two lateral swinging segments SW1 are extended along a first direction D1. The middle swinging segment SW2 is extended along a second direction D1 and connected between the two lateral swinging segments SW1. The first direction D1 and the second direction D2 are not in parallel with each other. Preferably but not exclusively, the first direction D1 and the second direction D2 are perpendicular to each other. In case that the first direction D1 and the second direction D2 are perpendicular to each other, the two lateral swinging segments SW1 and the middle swinging segment SW2 are collaboratively formed as the U-shaped swinging structure 342. For complying with the U-shaped swinging structure 342, the first adhesive layer 35 is a U-shaped adhesive layer. Due to this structure design, the first adhesive layer 35 can be placed on the swinging structure 342 to cover the swinging structure 342. Consequently, the contact area between the elastic element 34 and the touch member 31 is increased. In such way, the stability of switching the touch member 31 relative to the base plate 30 is enhanced, and the structural strength of the touchpad module 3 is increased. Moreover, in this embodiment, there is a gap G between each lateral swinging segment SW1 of the swinging structure 342 and the fixing structure 341. The gap G has the following benefits. While the touch member 31 is swung relative to the base plate 30, the two lateral swinging segments SW1 of the swinging structure 342 are not interfered by the fixing structure 341. Consequently, the swinging smoothness of the touch member 31 is not adversely affected.

Please refer to FIGS. 5 and 6 again. In this embodiment, the touch member 31 comprises a circuit board 311 and a covering plate 312. The covering plate 312 is located over the circuit board 311. Moreover, the covering plate 312 and the circuit board 311 are combined together. In this embodiment, the switch 32 is disposed on a first edge of a surface of the circuit board 311 that faces the base plate 30. Moreover, through the first adhesive layer 35, the swinging structure 342 of the elastic element 34 is attached on a second edge of the surface of the circuit board 311 that faces the base plate 30. Preferably but not exclusively, the covering plate 312 is made of glass. It is noted that the material of the covering plate 312 may be varied according to the practical requirements.

Please refer to FIGS. 5 and 6 again. The touchpad module 3 further comprises at least one fastening element (e.g., two fastening elements). In this embodiment, the touchpad module 3 comprises a first fastening element 37 and a second fastening element 38. In this embodiment, the base plate 30 is fixed on the fixing frame 44 of the computing device 4 through the first fastening element 37 and the second fastening element 38. It is noted that the number of the at least one fastening element is not restricted and may be varied according to the practical requirements.

The operations of the touchpad module 3 will be described in more details as follows.

Please refer to FIG. 6. When an external force is exerted on the touchpad module 3, the touch member 31 of the touchpad module 3 is swung toward the base plate 30 by using the supporting element 33 as a fulcrum. Consequently, the switch 32 on the touch member 31 is contacted with the triggering part 300 of the base plate 30. As the touch member 31 is swung, the middle swinging segment SW2 of the swinging structure 342 is swung toward the base plate 30, and the two lateral swinging segments SW1 of the swinging structure 342 are swung away from the supporting element 33.

Please refer to FIG. 5 again. The external force exerted on the touchpad module 3 is eliminated. In response to a restoring force of the elastic element 330, the swinging structure 342 of the elastic element 34 is swung with respect to a junction C between the middle swinging segment SW2 and the fixing structure 341. Consequently, the middle swinging segment SW2 is swung away from the base plate 30, and the two lateral swinging segments SW1 are swung toward the supporting element 33. Under this circumstance, the touch member 31 is swung away from the base plate 30 by using the supporting element 33 as the fulcrum, and the switch 32 on the touch member 31 is separated from the triggering part 300 of the base plate 30.

From the above descriptions, the present invention provides the touchpad module and the computing device with the touchpad module. The elastic element includes the U-shaped swinging structure and the fixing structure. The fixing structure is fixed on the supporting element. The fixing structure is connected with the middle swinging segment of the swinging structure and arranged between the two lateral swinging segments. The swinging structure of the elastic element includes the two lateral swinging segments and the middle swinging segment between the two lateral swinging segments. For complying with the U-shaped swinging structure, the first adhesive layer is a U-shaped adhesive layer. Due to this structure design, the contact area between the elastic element and the touch member is increased. Since the first adhesive layer is placed on the swinging structure to cover the swinging structure, the stability of switching the touch member relative to the base plate is enhanced. Due to this structural design, the swinging action of the touch member with respect to the base plate by using the supporting element as the fulcrum is stable (i.e., not aslant). Moreover, the results of the touch test indicate that the above structural design of the touchpad module can achieve stable travelling distance, click force and recovery ratio.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touchpad module for a computing device, the computing device comprising a fixing frame, the touchpad module comprising:
   a base plate disposed within the fixing frame, and comprising a triggering part;
   a touch member disposed within the fixing frame, wherein the touch member and the base plate are opposed to each other;
   a switch disposed on the touch member and aligned with the triggering part of the base plate;
   a supporting element arranged between the base plate and the touch member; and
   an elastic element comprising a fixing structure and a swinging structure, wherein the fixing structure is arranged between the supporting element and the touch member, the swinging structure comprises two lateral swinging segments and a middle swinging segment, the middle swinging segment is connected between the two lateral swinging segments, the two lateral swinging segments are arranged between the supporting element and the touch member, the middle swinging segment is arranged between the base plate and the touch member, the fixing structure is connected with the middle swinging segment, and the fixing structure is arranged between the two lateral swinging segments, wherein when an external force is exerted on the touchpad module, the touch member is swung toward the base plate by using the supporting element as a fulcrum, so that the switch is contacted with the triggering part, wherein while the touch member is swung toward the base plate, the middle swinging segment is swung toward the base plate, and the two lateral swinging segments are swung away from the supporting element.

2. The touchpad module according to claim 1, wherein when the external force exerted on the touchpad module is eliminated, the swinging structure is swung with respect to a junction between the middle swinging segment and the fixing structure in response to a restoring force of the elastic element, wherein while the swinging structure is swung, the middle swinging segment is swung away from the base plate, the two lateral swinging segments are swung toward the supporting element, and the touch member is swung away from the base plate by using the supporting element as the fulcrum, so that the switch is separated from the triggering part.

3. The touchpad module according to claim 1, wherein the touchpad module further comprises a first adhesive layer, and the first adhesive layer is arranged between the swinging structure of the elastic element and the touch member, wherein the middle swinging segment and the two lateral swinging segments of the swinging structure are covered by the first adhesive layer, and the swinging structure is attached on the touch member through the first adhesive layer.

4. The touchpad module according to claim 3, wherein the first adhesive layer has a U-shaped profile.

5. The touchpad module according to claim 3, wherein the touch member comprises a circuit board and a covering plate, wherein the covering plate is located over the circuit board, the switch is disposed on the circuit board, and the swinging structure is attached on the circuit board through the first adhesive layer.

6. The touchpad module according to claim 1, wherein the fixing structure of the elastic element is fixed on the supporting element by a laser welding process.

7. The touchpad module according to claim 1, wherein the touchpad module further comprises a second adhesive layer, and the second adhesive layer is arranged between the base plate and the supporting element, wherein the supporting element is attached on the base plate through the second adhesive layer.

8. The touchpad module according to claim 1, wherein the two lateral swinging segments of the swinging structure are extended along a first direction, and the middle swinging segment is extended along a second direction and connected between the two lateral swinging segments, wherein the first direction and the second direction are not in parallel with each other, and the two lateral swinging segments and the middle swinging segment are collaboratively formed as the swinging structure with a U-shaped profile.

9. The touchpad module according to claim 1, wherein each lateral swinging segment of the swinging structure and the fixing structure are separated from each other by a gap.

10. The touchpad module according to claim 1, wherein the touchpad module further comprises at least one fastening element, and the base plate is fixed on the fixing frame through the at least one fastening element.

11. A computing device, comprising:
  a casing, wherein a fixing frame is concavely formed in the casing;
  a processor disposed within the casing; and
  a touchpad module disposed within the casing and electrically connected with the processor, wherein the touchpad module comprises:
    a base plate disposed within the fixing frame, and comprising a triggering part;
    a touch member disposed within the fixing frame, wherein the touch member and the base plate are opposed to each other;
    a switch disposed on the touch member and aligned with the triggering part of the base plate;
    a supporting element arranged between the base plate and the touch member; and
    an elastic element comprising a fixing structure and a swinging structure, wherein the fixing structure is arranged between the supporting element and the touch member, the swinging structure comprises two lateral swinging segments and a middle swinging segment, the middle swinging segment is connected between the two lateral swinging segments, the two lateral swinging segments are arranged between the supporting element and the touch member, the middle swinging segment is arranged between the base plate and the touch member, the fixing structure is connected with the middle swinging segment, and the fixing structure is arranged between the two lateral swinging segments,
  wherein when an external force is exerted on the touchpad module, the touch member is swung toward the base plate by using the supporting element as a fulcrum, so that the switch is contacted with the triggering part, wherein while the touch member is swung toward the base plate, the middle swinging segment is swung toward the base plate, and the two lateral swinging segments are swung away from the supporting element.

* * * * *